United States Patent
Yoshida et al.

[19]

[11] Patent Number: 5,949,764
[45] Date of Patent: Sep. 7, 1999

[54] CONFERENCE CALL ON A PERSONAL HANDY PHONE SYSTEM PORTABLE STATION

[75] Inventors: Satoshi Yoshida, Nice; Patrick Feyfant, Roulon; Laurent Winckel, Antibes; Denis Archambaud, Antibes; Oliver Weigelt, Antibes; Philippe Gaglione, Mandelieu; Varenka Martin, Antibes, all of France

[73] Assignee: VLSI Technology, Inc., San Jose, Calif.

[21] Appl. No.: 08/975,943

[22] Filed: Nov. 21, 1997

[51] Int. Cl.$^6$ .................................................. H04L 12/28
[52] U.S. Cl. .......................... 370/263; 370/337; 455/416
[58] Field of Search ................................. 370/260, 263, 370/264, 265, 266, 267, 336, 337, 347; 455/416; 379/202, 206

[56] References Cited

U.S. PATENT DOCUMENTS

| | | | |
|---|---|---|---|
| 4,831,618 | 5/1989 | Bruce | 370/264 |
| 5,636,243 | 6/1997 | Tanaka | 375/219 |
| 5,719,859 | 2/1998 | Kobayashi | 370/347 |

OTHER PUBLICATIONS

"Personal Handy Phone System ARIB Standard", Version 2, Dec. 26, 1995 Association of Radio Industries and Businesses (ARIB).

Takeshita et al., "Personal Handy–Phone System (PHS) Guidebook" Ministries of Posts and Telecommunications, Japan.

*Primary Examiner*—Chau Nguyen
*Assistant Examiner*—Thinh Vu
*Attorney, Agent, or Firm*—Wagner, Murabito & Hao

[57] ABSTRACT

A system that enables a portable station of the personal handy phone system to support a conference call. The present invention provides this capability by empowering a portable station to communicate with up to four cell stations simultaneously enabling the user of the portable station to communicate with the users of four other telecommunication devices. Specifically, the present invention modifies the internal circuitry of a portable station to increase the number of receiving channel circuits to four and the transmitting channel circuits to four while adding a digital signal processor to mix the different received and outgoing voice signals. The increased number of receiving and transmitting channel circuits enables a portable station to utilize all the communication slots located within the frames of the radio communication interface of the personal handy phone system. Communication is time-multiplexed across these slots. The frames each have eight slots, four for receiving data and four for transmitting data. These eight slots enable a portable station implemented with the present invention to support communication with four cell stations simultaneously. To facilitate this type of communication, the slots located within the portable station frames operate in conjunction with the slots located within the cell station frames of the cell stations involved in the conference call thereby creating communication channels. The cell stations involved in the conference call each utilize different communication channels to communicate with the portable station implemented with the present invention.

20 Claims, 8 Drawing Sheets

CONFERENCE CALL ON A PERSONAL HANDY PHONE SYSTEM PORTABLE STATION

TECHNICAL FIELD

The present invention relates to the field of wireless telecommunications. More specifically, the present invention relates to enabling a wireless portable station to support conference calling within the personal handy phone system.

BACKGROUND ART

Within the field of wireless telecommunications systems there exists a system referred to as the personal handy phone system, otherwise known as PHS. Within the personal handy phone system a user of a portable or personal station (PS) is able to communicate with a user of another telecommunication device by way of a cell station (CS). Along with providing its users wireless voice communication, the personal handy phone system also provides facsimile (fax) and multimedia communication capabilities. Along with providing all these communication capabilities, there is still a disadvantage associated with the personal handy phone system.

The disadvantage associated with the personal handy phone system of the prior art involves conference calls. The ability of portable station users to participate in conference calls has not been widely available for public use because of limitations of the personal handy phone system. A conference call allows the user of a portable station to communicate with more than one user of a telecommunication device simultaneously. For instance, a conference call allows several people located throughout the world to meet together simultaneously and discuss important business issues critical to their company. Conference calls are a common occurrence within public telephone network systems, but unfortunately, the customers using a portable station within the personal handy phone system are generally unable to realize the advantages associated with participating in a conference call for business or for pleasure.

Therefore, it would be advantageous to provide a system that enables users of portable stations to participate in conference calls for public use, but does not require the modification of the existing cell station network established within the personal handy phone system. The present invention provides this advantage.

DISCLOSURE OF THE INVENTION

The present invention includes a system that enables a wireless portable station to support conference calling within the personal handy phone system. The present invention provides this capability by empowering a portable station to communicate with up to four cell stations simultaneously enabling the user of the portable station to communicate with the users of four other telecommunication devices. Some of the telecommunication devices that the present invention portable station is able to communicate with during a conference call include other portable stations and telephones which are connected to a public telephone wire network system.

Specifically, the present invention system modifies the internal circuitry of the portable station to increase the number of receiving and transmitting channel circuits to include four receiving channel circuits and four transmitting channel circuits. Furthermore, a digital signal processor circuit is added to the internal circuitry of the portable station to digitally mix the different received and outgoing voice signals of the conference call. The increased number of receiving and transmitting channel circuits enables a portable station to utilize all the communication slots located within the 5 millisecond communication frames of the radio communication interface of the personal handy phone system. Communication is time-multiplexed across these slots.

Within the 5 millisecond communication frames there exists eight slots, four slots for receiving data and four slots for transmitting data. These eight slots enable the present invention portable station to communicate with four cell stations simultaneously. To facilitate this type of communication, the slots located within the portable station frames of the portable station operate in conjunction with the slots located within the cell station frames of the cell stations involved in the conference call thereby creating communication channels. To enable four different cell stations to communicate during a conference call with a present invention portable station, the cell stations each utilize different communication channels to communicate with the present invention portable station for the duration of their communication session.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

In the following detailed description of the present invention, a system for enabling a portable station to support conference calling within the personal handy phone system, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The present invention operates within the personal handy phone system which provides its users wireless voice communication. Along with providing its users wireless voice communication, the personal handy phone system also provides facsimile (fax) and multimedia communication capabilities. The personal handy phone system has the ability to operate both indoors and outdoors, which offers greater communication opportunities. For instance, the indoor operations include using it within office spaces, homes, hotels, shopping malls and airports. Furthermore, the outdoor operations of the personal handy phone system include using it within rural, suburban, and city areas. The personal handy phone system is well known by those skilled in the art, and is discussed in a number of publications, such as Personal Handy-Phone System (PHS) Guidebook by the Ministry of Posts & Telecommunications, Japan (1995) and Personal Handy Phone System ARIB Standard Version 2 by the Association of Radio Industries and Businesses, (1995).

Figure 1A:
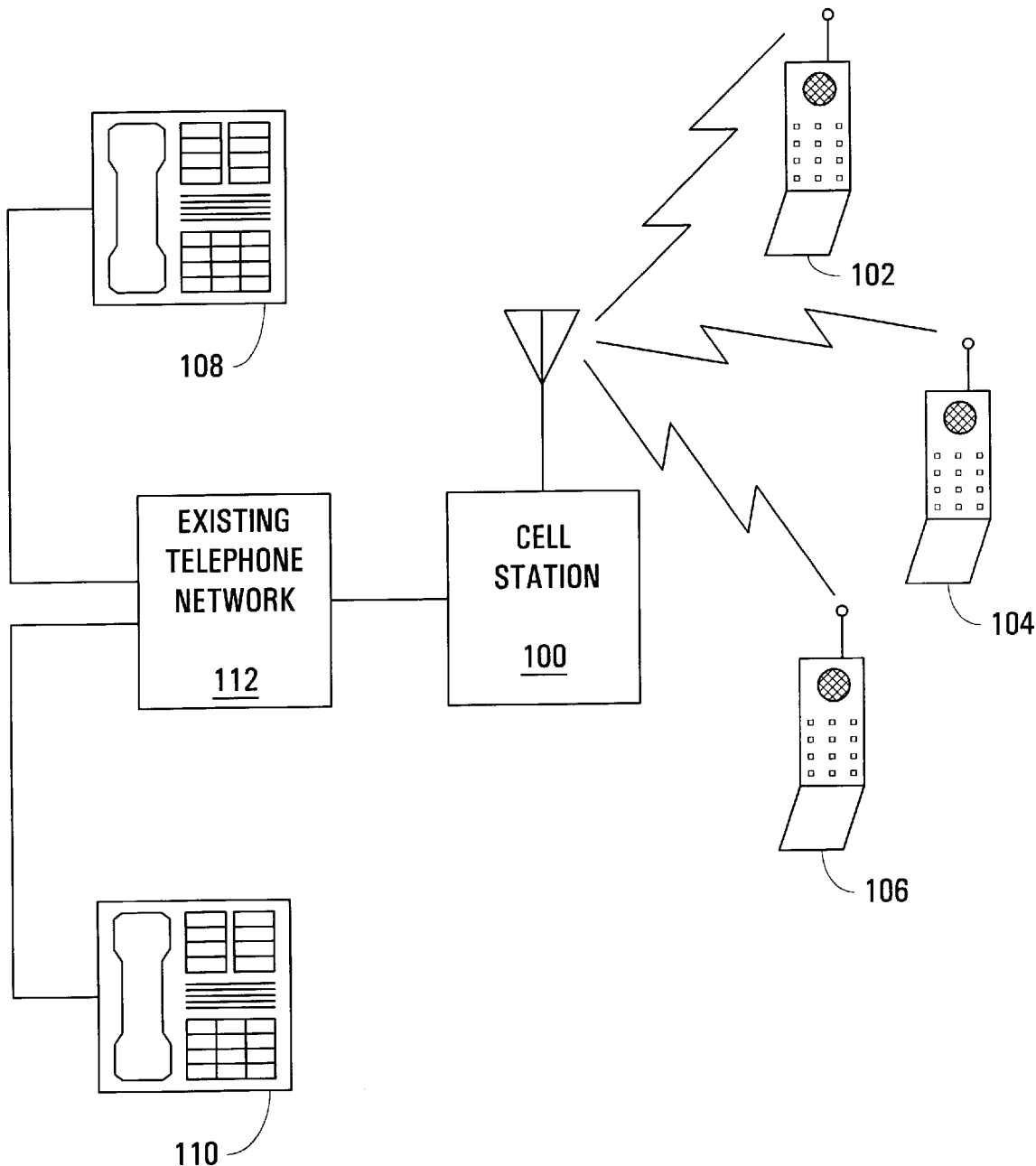
FIG. 1A illustrates a general overview of the personal handy phone system in which the present invention operates.

FIG. 1A illustrates a general overview of the personal handy phone system 50 in which the present invention operates. The two main components that are used within the personal handy phone system are a cell station (CS) and a personal or portable station (PS). Portions of the present invention are implemented within the internal circuitry of the portable station. Referring to FIG. 1A, portable stations 102–106 are similar in function to cordless telephone handsets and have the ability to transmit and receive voice information along with other types of data. Cell station 100 is a transmitter and receiver base station which can be implemented by coupling it into the existing public telephone network 112. Implemented in this way, cell station 100 enables the users of portable stations 102–106 to communicate with each other and with the users of telephones 108 and 110, which are coupled by wire to the existing public telephone network 112. The information that is communicated between cell station 100 and portable stations 102–106 is the same type of information (e.g., voice/data etc.) that can conventionally be transferred and received over a public telephone wire network system. Instead of communicating over a wire network, the personal handy phone system uses a wireless digital radio interface to communicate information between cell station 100 and portable stations 102–106. One embodiment of the digital radio interface used by the personal handy phone system 50 is a time division multiple access capability with time division duplexing (TDMA-TDD).

Figure 1B:
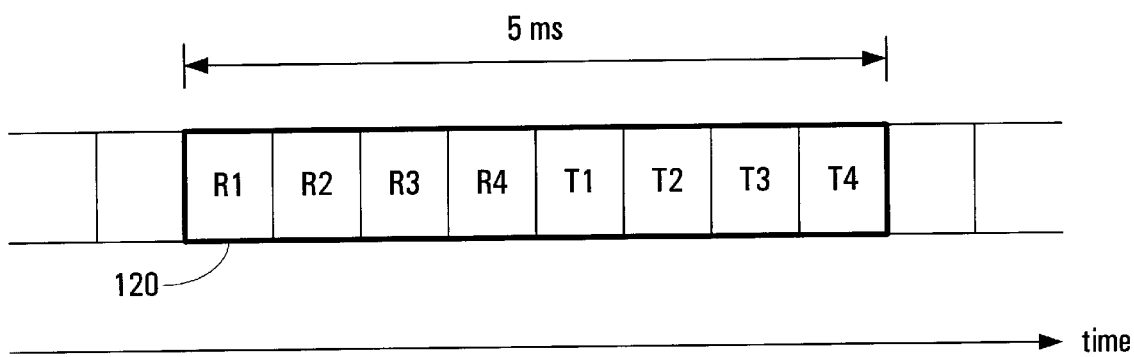
FIG. 1B illustrates one embodiment of a time division duplexed communication frame used within the personal handy phone system as a digital radio interface between cell stations and portable stations.

FIG. 1B illustrates a time division duplexed frame 120 that is used within the personal handy phone system 50 of FIG. 1A as a digital radio interface between cell station 100 and portable stations 102–106. Frame 120 has a time interval of 5 milliseconds which is divided into eight slots, four slots for receiving data (R1, R2, R3, R4) and four slots for transmitting data (T1, T2, T3, T4). A receiving slot and a transmitting slot (e.g., R2 and T2) operate in conjunction during communication with a device within the personal handy phone system 50 to form an independent communication channel. Therefore, frame 120 allows up to four logical channels of simultaneous communication e.g., between a personal station and four other cell stations.

The present invention enables portable station 102 of FIG. 1A of the personal handy phone system 50 to participate in conference calls which incorporates up to four other telecommunication devices. As part of the conference call communication link, portable station 102 can communicate with as many as four cell stations simultaneously. But if portable station 102 is only communicating with one cell station (e.g., cell station 100) during a conference call, it can use up to three communication channels of frame 120 of FIG. 1B to communicate with as many as three telecommunication devices, while the remaining communication channel is used as a control channel.

Figure 2:
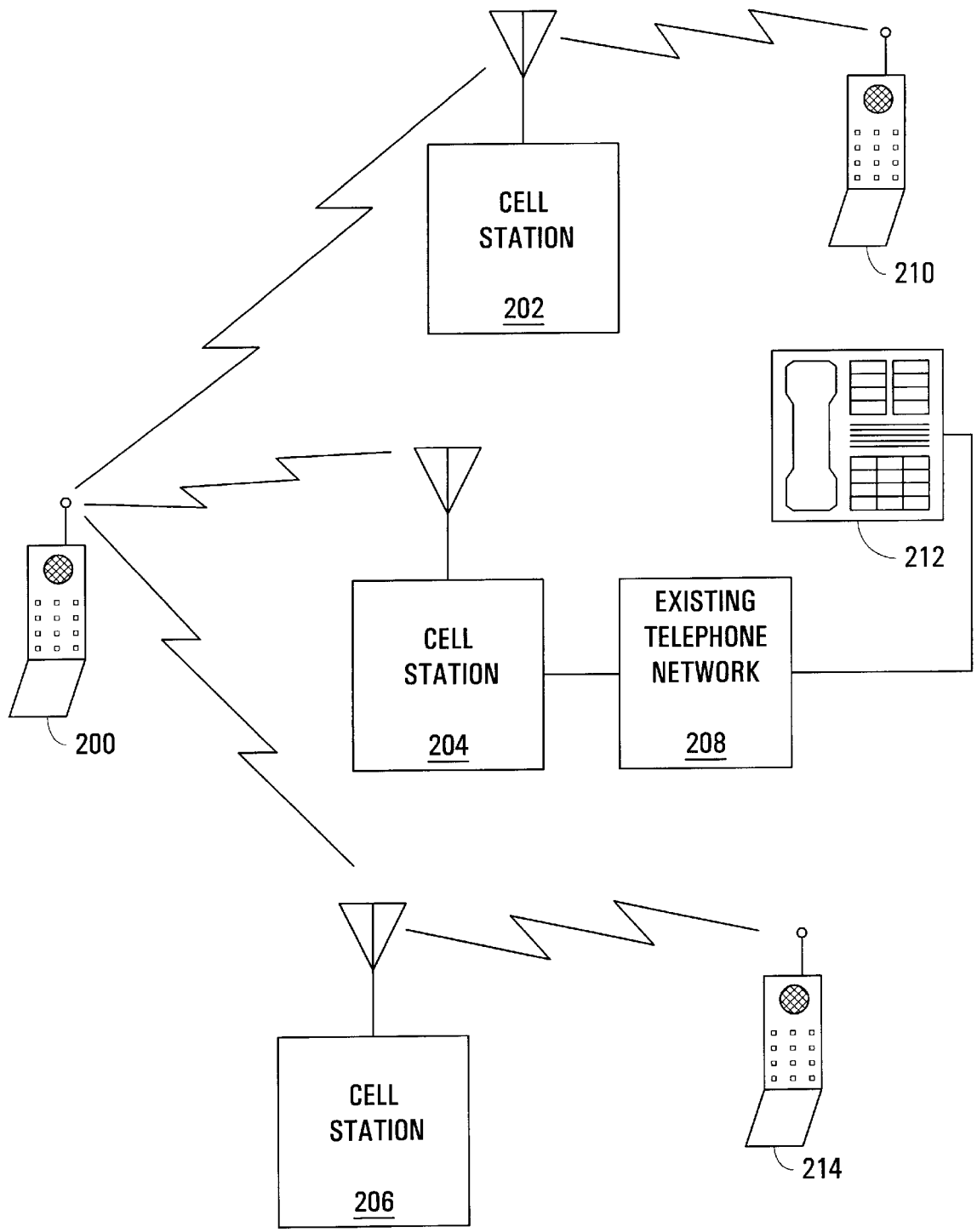
FIG. 2 illustrates a portable station of the personal handy phone system implemented with the present invention supporting a conference call with three cell stations.

FIG. 2 illustrates a present invention embodiment of a portable station 200 within a personal handy phone system and supporting a conference call which utilizes cell stations 202, 204 and 206 simultaneously to communicate with telephone 212 and portable stations 210 and 214. For the user of portable station 200 to support a conference call that includes the users of telephone 212 and portable stations 210 and 214, an initial communication link is first established between portable station 200 and one of these other telecommunication devices via a cell station. This initial communication link can be established by the user of portable station 200 calling another telecommunication device or by the user of another telecommunication device calling portable station 200.

Once the initial communication link is established between portable station 200 of FIG. 2 and another telecommunication device (e.g., portable station 210), there are two different ways in which portable station 200 can support a conference call. One way portable station 200 can support a conference call after the initial communication link is established is for the user of portable station 200 to initiate a conference call by calling another telecommunication device (e.g., telephone 212). Another way portable station 200 can support a conference call after the initial communication link has been established is for the user of another telecommunication device (e.g., telephone 212) to call portable station 200. Both of these situations result in portable station 200 supporting a conference call and are described in detail below.

For portable station 200 of FIG. 2 to support a conference call which also includes telephone 212, portable stations 210 and 214, an initial communication link is first established. One way to establish the initial communication link is for portable station 200 to call portable station 210. To establish this initial communication link, the user of portable station 200 causes it to transmit to cell station 202 the unique identification code of portable station 210. Cell station 202 receives this transmission from portable station 200 and determines where to route the received data. Cell station 202 then transmits the received data to portable station 210. Once portable station 210 is activated by its user to receive the transmission of data from cell station 202, the communication link is established between portable stations 200 and 210.

Once a communication link is established between portable stations 200 and 210 of FIG. 2, the user of portable station 200 can initiate a conference call. To initiate a conference call, the user of portable station 200 causes it to transmit the unique identification code of the desired telecommunication device, telephone 212, to be included within the conference call. Cell station 204 receives the transmission from portable station 200 and determines where to route the received data. Cell station 204 then transmits the data to the existing telephone network 208 that it is connected to, which further determines where to route the received data. The existing telephone network 208 then transfers the data to telephone 212. Once a user of telephone 212 activates it to receive the transmission of data from existing telephone network 208, a conference call has been established that includes the users of telephone 212 and portable stations 200 and 210.

To include portable station 214 of FIG. 2 within the established conference call, the user of portable station 200 causes it to transmit the unique identification code of portable station 214. Cell station 206 receives the transmission from portable station 200 and determines where to route the received data. Cell station 206 then transmits the received data to portable station 214. Once a user of portable station 214 activates it to receive the transmission of data from cell station 206, a conference call is established that includes telephone 212 and portable stations 200, 210 and 214. Once this conference call is fully established, all the users of telephone 212 and portable stations 200, 210 and 214 can carry on a conversation with each other simultaneously.

Another way that portable station 200 of FIG. 2 can support a conference call after an initial communication link is established with a telecommunication device (e.g., portable station 210) is to receive a call from another telecommunication device (e.g., telephone 212). For instance, once an initial communication link is established between portable stations 200 and 210, telephone 212 can call portable station 200. The user of telephone 212 causes it to transfer the unique identification code of portable station 200 to the existing telephone network 208. The existing telephone network 208 receives the transferred data and determines where to route the received data. Existing telephone network 208 then transmits the data to cell station 204 that it is connected to, which further determines where to route the received data. Cell station 204 transmits the data to portable station 200. Once the user of portable station 200 activates it to receive the transmission of data from cell station 204, a conference call is established that includes telephone 212 and portable stations 200 and 210.

With reference to FIG. 2, after the conference call which includes telephone 212 and portable stations 200 and 210 is established, there are a couple ways in which portable station 214 can also be included in the conference call. One way to include portable station 214 within the established conference call is for the user of portable station 200 to call portable station 214. Another way portable station 214 can be included within the established conference call is for the user of portable station 214 to call portable station 200.

Figure 3:
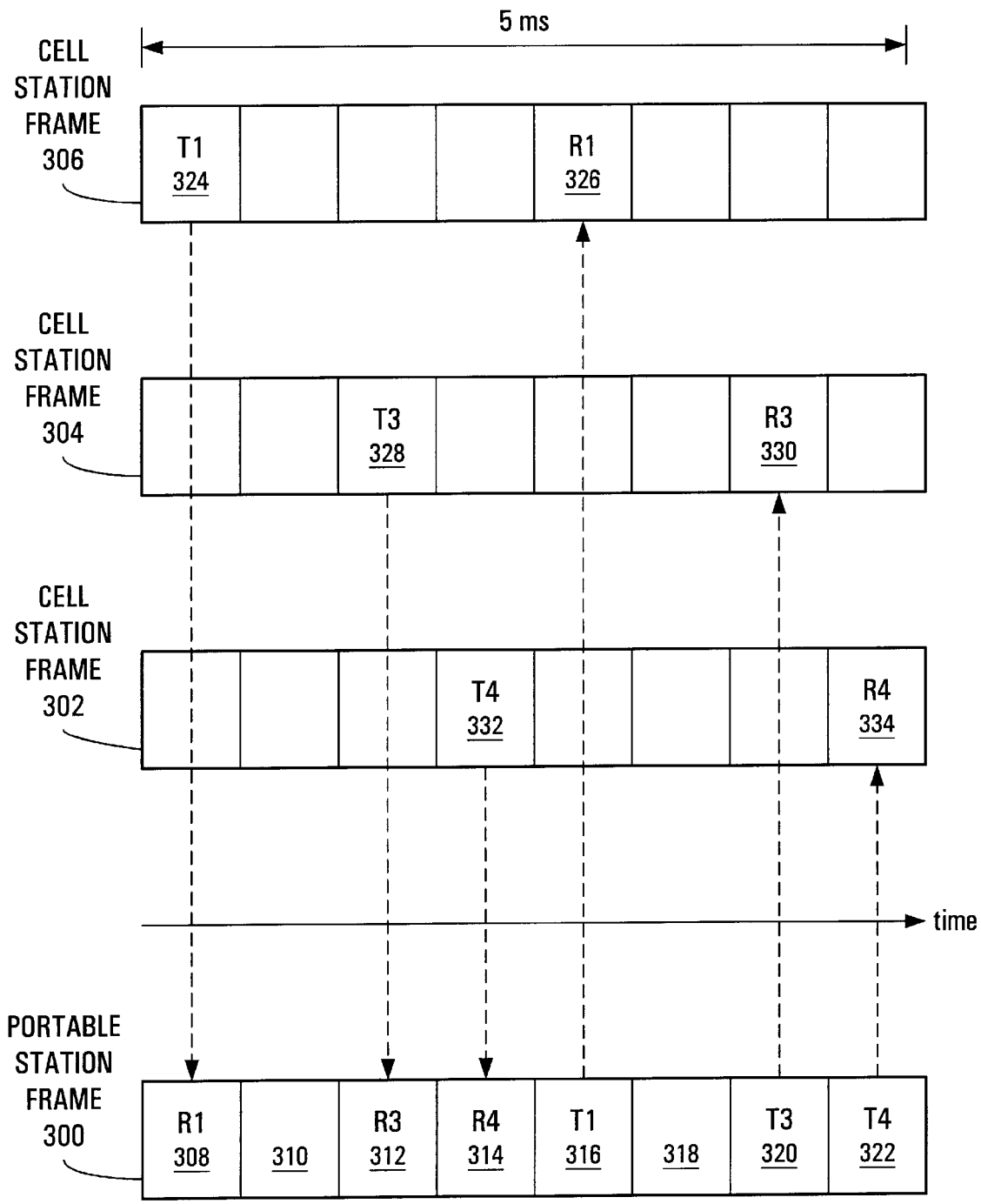
FIG. 3 illustrates the communication frames utilized within three cell stations and a portable station implemented with the present invention as it supports a conference call.

With reference to FIG. 3, one present invention embodiment of a portable station utilizes the time division multiple access capability with time division duplexing (TDMA-TDD) as a mechanism of communication with cell stations within the personal handy phone system. This digital radio interface used between a cell station and a portable station is divided into 5 millisecond (ms) frames. Within a service area of the personal handy phone system 50 of FIG. 1A, all the cell stations are synchronized and aligned on the same multiframe timing structure. FIG. 3 illustrates how the slots located within portable station frame 300 are utilized by a portable station implemented with the present invention to communicate with up to four cell stations during a conference call. The operation of the present invention frames are described with reference to FIG. 3 in conjunction with FIG. 2.

Portable station frame 300 of FIG. 3 represents a 5 ms frame that is utilized by portable station 200 of FIG. 2 which is implemented with the present invention. Cell station frames 302–306 represent frames that are utilized respectively by cell stations 202–206. Each 5 ms frame represented in FIG. 3 is divided into eight separate slots, four slots for receiving data (R1, R2, R3, R4) and four slots for transmitting data (T1, T2, T3, T4). Within portable station frame 300 the first four slots, slots 308–314, are utilized by portable station 200 for receiving data from cell stations 202–206 while the last four slots, slots 316–322, are utilized for transmitting data to cell stations 202–206. Conversely, within cell stations frames 302–306 the first four slots are utilized by cell stations 202–206 for transmitting data to portable stations (e.g., portable station 200) while the last four slots are utilized for receiving data from portable stations.

Portable station 200 of FIG. 2 is designed to be able to use all eight slots within portable station frame 300 of FIG. 3 enabling it to communicate with up to four separate cell stations during a conference call. To facilitate this type of communication, the slots located within portable station frame 300 of portable station 200 are aligned in time with the slots located within the cell station frames (e.g., frames 302–306) of the cell stations involved in the conference call. For instance, during slot 324, the first transmitting slot of frame 306, cell station 206 of FIG. 2 transmits data to portable station 200. Portable station 200 receives the transmitted data during slot 308, the first receiving slot of frame 300. Later, during slot 316, the first transmitting slot of frame 300, portable station 200 transmits data to cell station 206. Cell station 206 receives this transmitted data during slot 326, the first receiving slot of frame 306. This example demonstrates that portable station 200 and cell station 206 use corresponding receiving and transmitting slot positions (e.g., T1 and R1 for both frames) of their respective frames as their specific communication channel for the duration of their communication session.

To enable four different cell stations to communicate during a conference call with portable station 200 of FIG. 2, the cell stations each utilize different communication channels (e.g., slots) to communicate with portable station 200. For instance, cell station 204 and portable station 200 utilize the third transmitting slots (i.e., slots 320 and 328 of FIG. 3) and the third receiving slots (i.e., slots 312 and 330) of frames 300 and 304 as their communication channel for the duration of their communication session. Furthermore, cell station 202 and portable station 200 utilize the forth transmitting slots (i.e., slots 322 and 332) and the forth receiving slots (i.e., slots 314 and 334) of frames 300 and 302 as their communication channel for the duration of their communication session. It should be pointed out that once a communication channel is established between a cell station and portable station 200, it is not necessary that either device communicate during every transmitting and receiving slot of each frame. Instead, the established transmitting and receiving slots of their respective frames are for the exclusive use of that specific cell station (e.g., cell station 202) and portable station 200 for the duration of their communication session.

The following discussion explains more fully the manner in which the frames represented in FIG. 3 are utilized by portable station 200 of FIG. 2 and cell stations 202–206. Once a conference call has been established that includes telephone 212 and portable stations 200, 210 and 214, as discussed above, portable station 200 is able to receive and transmit data with cell stations 202–206. During slot 324, the first transmitting slot of frame 306, cell station 206 transmits data to portable station 200. During slot 308, the first receiving slot of frame 300, portable station 200 receives the data from cell station 206. During slots 310 of frame 300, portable station 200 is idle because it is not receiving data from any cell stations. During slot 312, the third receiving slot of frame 300, portable station 200 receives data from cell station 204 which transmitted the data during slot 328, the third transmitting slot of frame 304.

During the conference call represented in FIG. 3, the last four slots of portable station frame 300 are used by portable station 200 of FIG. 2 to transmit data to cell stations 202–206. Any time during a conference call portable station 200 transmits data to a cell station (e.g., cell station 206), it also retransmits the exact same data to all of the other cell stations (e.g., cell stations 202–204) participating in the conference call. For instance, during slot 316, the first transmitting slot of frame 300, portable station 200 transmits data to cell station 206. Cell station 206 receives this transmitted data during slot 326, the first receiving slot of frame 306. Later, during slots 320 and 322, portable station 200 retransmits the exact same data to cell stations 204 and 202 that was transmitted to cell station 206 during slot 316. Cell stations 204 and 202 each receive the transmitted data during slots 330 and 334, respectively. During slot 318, portable station 200 is idle because it is not transmitting data to any cell stations.

Figure 4:
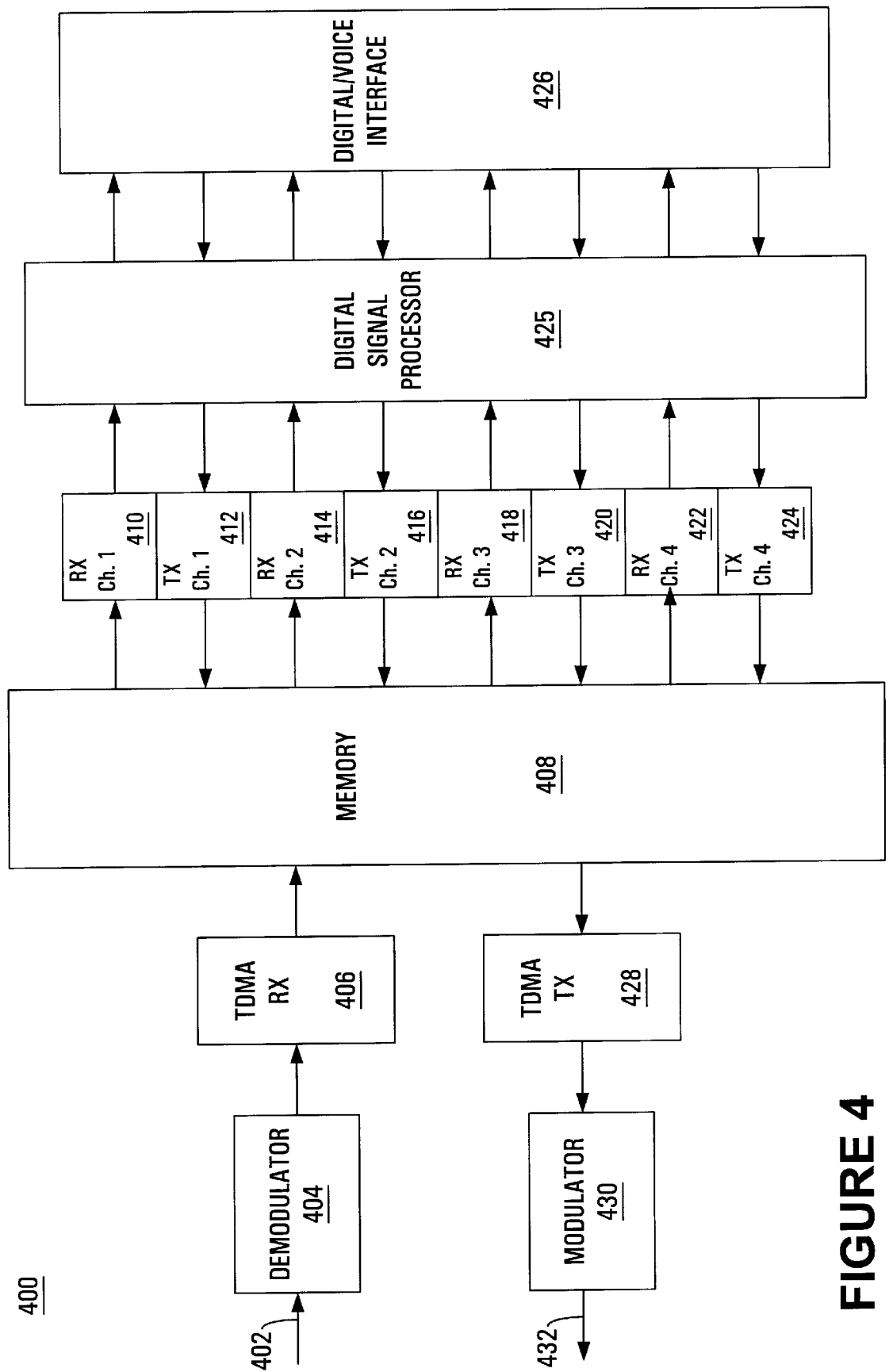
FIG. 4 illustrates a block diagram of the hardware used within one embodiment of the present invention enabling a portable station to support a conference call within the personal handy phone system.

FIG. 4 illustrates a block diagram of the hardware used within one embodiment of the present invention enabling a portable station to support a conference call within the personal handy phone system. The hardware within circuit 400 enables a portable station to communicate with four other telecommunication devices simultaneously. Radio communication signals 402 transmitted by a cell station are received by the portable station 200 of FIG. 2 and input into circuit 400. The radio communication signal 402 received by circuit 400 is demodulated by demodulator circuit 404. The time division multiple access receiver (TDMA RX) circuit 406 processes the digital baseband signal received from demodulator 404, which encompasses several steps. For instance, first the TDMA RX 406 detects the Unique Word of the digital baseband signal and then determines its specific channel type. Next the TDMA RX 406 de-scrambles the digital baseband signal and also decrypts the digital baseband signal if it is voice communication data. The TDMA RX 406 then calculates the cyclic redundancy check (CRC) of the digital baseband signal.

Once the TDMA RX 406 of FIG. 4 has processed the digital baseband signal, it is then stored within memory unit 408. One embodiment of memory unit 408 within the present invention is a 2 kilobits random access memory (RAM) unit. The digital baseband signal is retrieved from memory unit 408 by one of the four receiving (RX) channel circuits 410, 414, 418 or 422, depending on whether a communication channel has been established between the cell station and the portable station. Whichever RX channel circuit of 410, 414, 418 and 422 receives the digital baseband signal, it converts the digital baseband signal from one data format into another data format which is sent to the digital signal processor (DSP) circuit 425. For instance, one embodiment of a RX channel circuit receives the digital baseband signal, which is in a 32 kilobits per second adaptive differential pulse code modulation (ADPCM) data format, and converts it into a 64 kilobits per second pulse code modulation (PCM) data format. The four RX channel circuits 410, 414, 418 and 422 of circuit 400 enable a portable station to simultaneously process four incoming digital baseband signals that were transmitted from as many as four separate cell stations.

Digital signal processor circuit 425 of FIG. 4 receives the converted digital baseband voice signal from RX channel circuits 410, 414, 418 and 422. In order to mix more than two voice signals digitally, digital signal processor circuit 425 is utilized within circuit 400. The digital signal processor circuit 425 digitally mixes the received digital baseband voices signal with any other digital baseband voice signals that were received at the same time. Once the digital baseband voice signals are digitally mixed, they are transferred by digital signal processor 425 to the digital/voice interface 426. If the digital baseband voice signal is not received by the digital signal processor circuit with any other digital baseband signals, it transfers the digital baseband signal to the digital/voice interface circuit 426. If a digital baseband signal is not voice signals (e.g., transmitted by a facsimile machine or a computer), the digital signal processor 425 does not process that signal but instead transfers it to the digital/voice interface circuit 426.

Digital/voice interface circuit 426 of FIG. 4 is a digital interface circuit that converts a received voice digital baseband signal into an analog voice signal to eventually be received by the user of the portable station. If the digital baseband signal is intended for a facsimile (fax) machine, computer or other type of device, the digital/voice interface 426 transfers the digital baseband signal to the appropriate device. One embodiment of the digital/voice interface 426 within the present invention is a pulse code modulation (PCM)/voice interface using a PCM strobe signal that operates at 8 kilohertz. Moreover, other embodiments of the digital/voice interface 426 include an integrated services digital network (ISDN) interface or an automatic data processing (ADP) SIMM interface.

When portable station 200 of FIG. 2 of the present invention transmits communication data, the digital/voice interface circuit 426 of FIG. 4 handles the outgoing signals. If the outgoing signal is voice communication data, the digital/voice interface 426 converts the analog voice signal into a digital voice signal that it transfers to the digital signal processor circuit 425. If the outgoing communication data originated from a fax machine, computer or other type of device, the digital/voice interface 426 transfers the outgoing digital signal to the digital signal processor 425. Digital signal processor 425 digitally mixes the outgoing digital voice signals which are input into any one of the four transmitting (TX) channel circuits 412, 416, 420 or 424, depending on whether a communication channel has been established between a cell station and the portable station. If the outgoing communication data originated from a fax machine, computer or other type of device, the digital signal processor 425 transfers the outgoing digital signal to any one of the four transmitting (TX) channel circuits 412, 416, 420 or 424.

Whichever TX channel circuit of 412, 416, 420 and 424 receives the outgoing digital signal, it converts the digital signal from one data format into another data format which is then stored within memory unit 408. For instance, one embodiment of a TX channel circuit receives the outgoing digital signal, which is in a 64 kilobits per second pulse code modulation (PCM) data format, and encodes it into a 32 kilobits per second adaptive differential pulse code modulation (ADPCM) data format. The four TX channel circuits 412, 416, 420 and 424 of circuit 400 enable a portable station to simultaneously process four outgoing digital signals that will be transmitted to as many as to four separate cell stations.

Time division multiple access transmitter (TDMA TX) circuit 428 of FIG. 4 retrieves the outgoing digital baseband signal from memory unit 408 and processes it, which encompasses several steps. For instance, if the outgoing digital baseband signal is voice communication the TDMA TX 428 first encrypts the digital baseband signal. If the outgoing digital baseband signal is not voice communication, TDMA TX 428 skips the encryption step. The TDMA TX 428 next scrambles the outgoing digital baseband signal. Next the TDMA TX 428 calculates the cyclic redundancy check (CRC) of the outgoing digital baseband signal. The TDMA TX 428 then assembles the slot data for the outgoing digital baseband signal, e.g., adding the Unique Word, the channel identifier (CI), the cyclic redundancy check (CRC), etc.

Once the TDMA TX 428 of FIG. 4 has finished processing the outgoing digital baseband signal, it is then transferred to modulator circuit 430. The outgoing digital baseband signal is modulated by modulator 430 into a radio communication signal 432 and output from circuit 400. Circuit 400 of the present invention enables a user of portable station 200 of FIG. 2 to support a conference call for public use, but does not require the modification of the existing cell station network established within the personal handy phone system.

Figure 5:
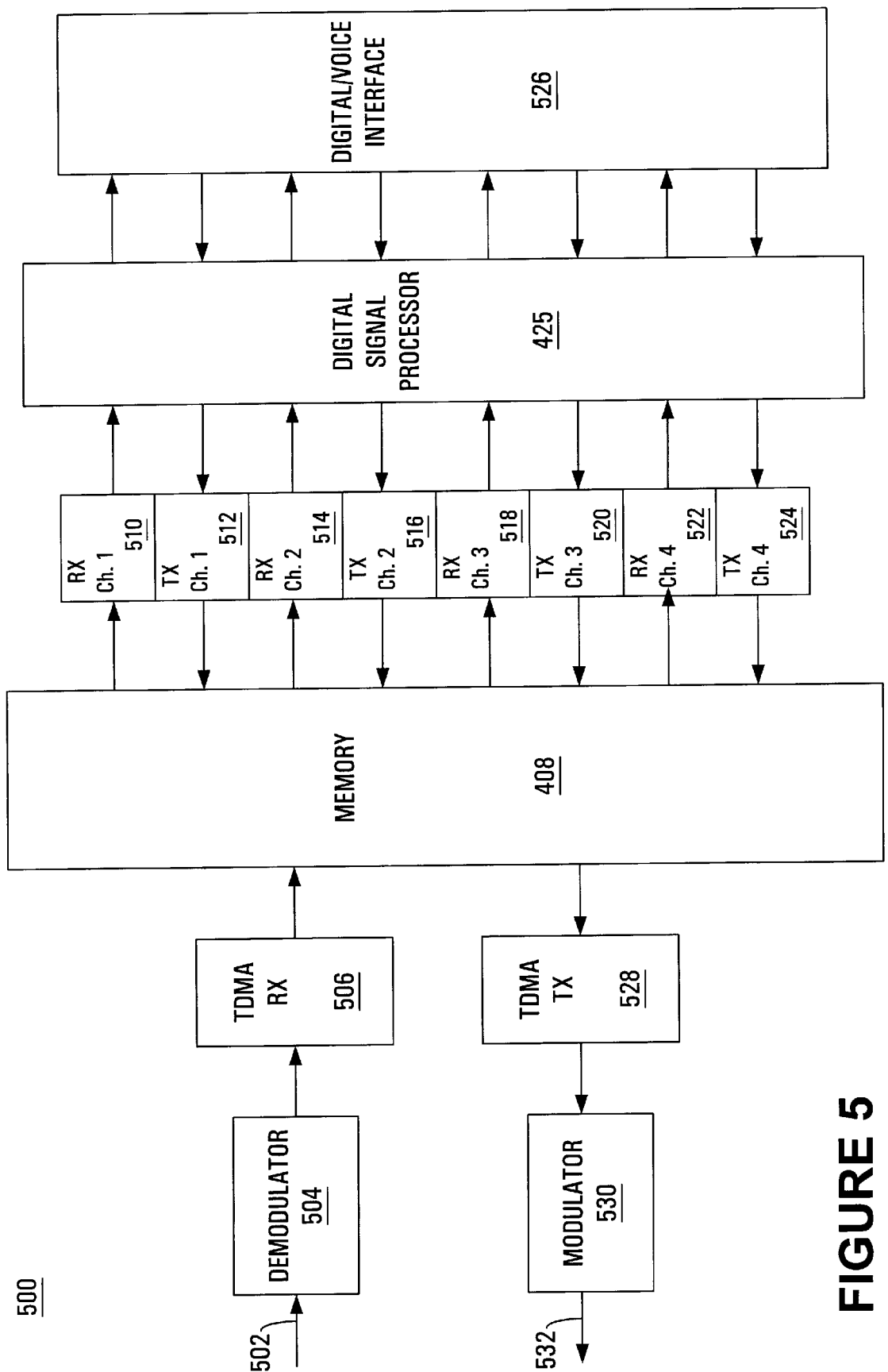
FIG. 5 illustrates a block diagram of the hardware used within one embodiment of the present invention enabling a cell station to participate in a conference call within the personal handy phone system.

FIG. 5 illustrates a block diagram of the hardware used within one embodiment of the present invention enabling a cell station to participate in a conference call within the personal handy phone system. The hardware within circuit 500 operates in the same manner described above for circuit 400 of FIG. 4. Circuit 500 includes demodulator circuit 504, time division multiple access receiver (TDMA RX) circuit 506, memory unit 508, receiving (RX) channel circuits 510, 514, 518 and 522, transmitting (TX) channel circuits 512, 516, 520 and 524, digital signal processor circuit 525, digital/voice interface circuit 526, time division multiple access transmitter (TDMA TX) circuit 528 and modulator circuit 530.

The operation of the present invention circuits 400 and 500 are described with reference to FIGS. 4 and 5, respectively, in conjunction with FIGS. 2 and 3. FIG. 3 illustrates the communication frames utilized within cell stations 202–206 of FIG. 2 and portable station 200, implemented with the present invention, as they participate in a conference call. During a conference call cell station 206 transmits data during slot 324 of FIG. 3, the first transmitting slot of frame 306, using transmitting (TX) channel 512 (TX channel 1) of FIG. 5. When portable station 200 receives the transmitted data during slot 308, the first receiving slot of frame 300, it uses receiving (RX) channel 410 (RX channel 1) of FIG. 4. Later, during slot 316, the first transmitting slot of frame 300, portable station 200 transmits data to cell station 206 utilizing TX channel 412 (TX channel 1) of circuit 400. Cell station 206 receives this transmitted data during slot 326, the first receiving slot of frame 306, utilizing RX channel 510 (RX channel 1) of circuit 500. This example demonstrates that portable station 200 and cell station 206 use corresponding receiving and transmitting channel circuits (e.g., RX and TX channel 1) as their specific communication channel for the duration of their communication session of the conference call.

Moreover, during the conference call of FIG. 3 cell station 204 of FIG. 2 transmits data during slot 328, the third transmitting slot of frame 304, using transmitting (TX) channel 520 (TX channel 3) of FIG. 5. When portable station 200 receives the transmitted data during slot 312, the third receiving slot of frame 300, it uses receiving (RX) channel 418 (RX channel 3) of FIG. 4. Later, during slot 320, the third transmitting slot of frame 300, portable station 200 transmits data to cell station 204 utilizing TX channel 420 (TX channel 3) of circuit 400. Cell station 204 receives this transmitted data during slot 330, the third receiving slot of frame 304, utilizing RX channel 518 (RX channel 3) of circuit 500.

Furthermore, during the conference call of FIG. 3 cell station 202 of FIG. 2 transmits data during slot 332, the forth transmitting slot of frame 302, using transmitting (TX) channel 524 (TX channel 4) of FIG. 5. When portable station 200 receives the transmitted data during slot 314, the forth receiving slot of frame 300, it uses receiving (RX) channel 422 (RX channel 4) of FIG. 4. Later, during slot 322, the forth transmitting slot of frame 300, portable station 200 transmits data to cell station 202 utilizing TX channel 424 (TX channel 4) of circuit 400. Cell station 202 receives this transmitted data during slot 334, the forth receiving slot of frame 302, utilizing RX channel 522 (RX channel 4) of circuit 500.

Figure 6:
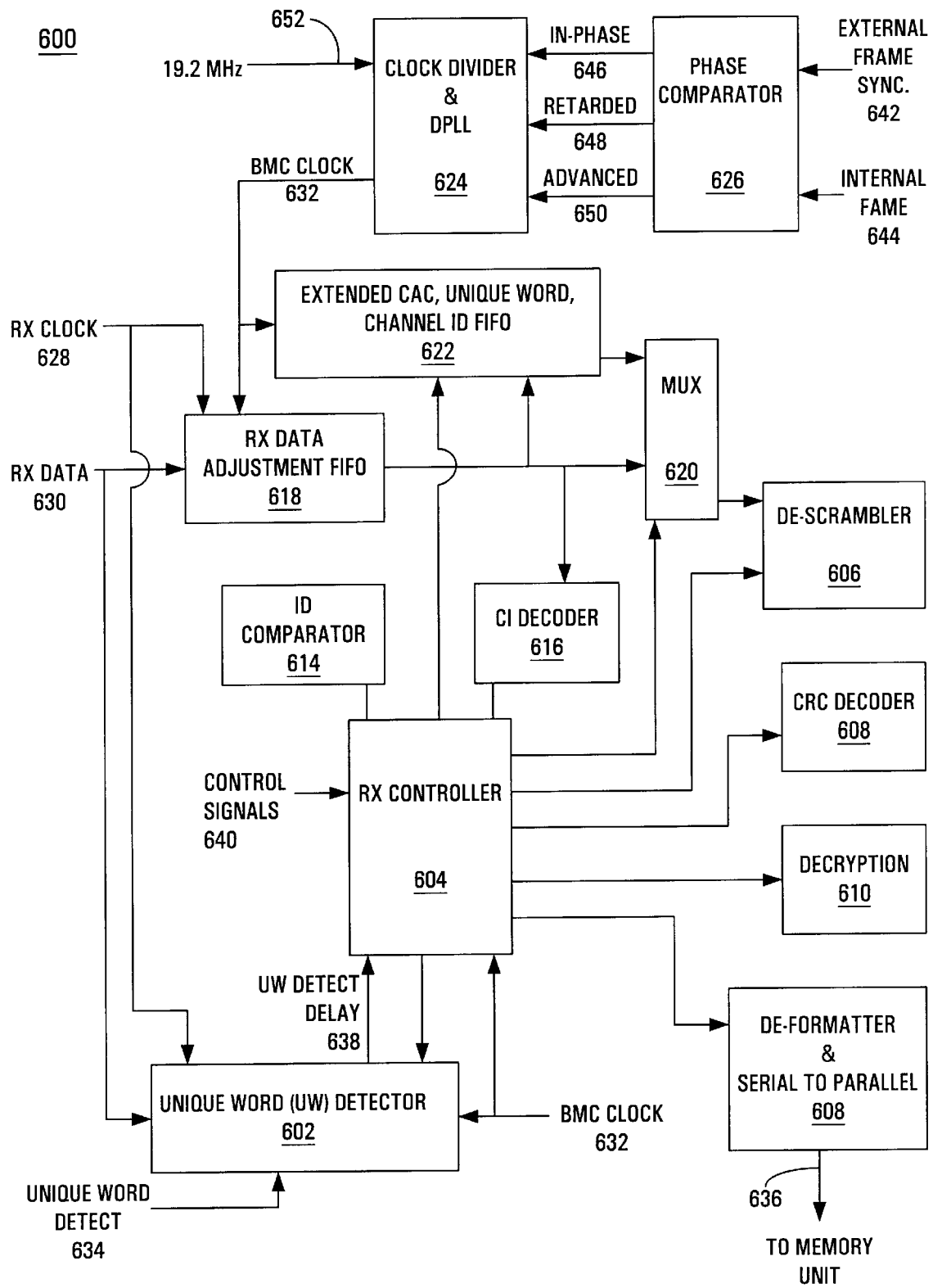
FIG. 6 illustrates a block diagram of the hardware located within one present invention embodiment of the time division multiple access receiver (TDMA RX) of FIGS. 4 and 5.

FIG. 6 illustrates a block diagram of the hardware located within circuit 600, which is one present invention embodiment of the time division multiple access receiver (TDMA RX) 406 and 506 of FIGS. 4 and 5, respectively. Receiver (RX) controller circuit 604 communicates with multiplexer (MUX) circuit 620, de-scrambler circuit 606, cyclic redundancy check (CRC) decoder circuit 608, decryption circuit 610, de-formatter and serial to parallel circuit 612, extended common access channel (XCAC)/Unique Word (UW)/channel identifier (CI) first in first out (FIFO) circuit 622, unique word detector circuit 602, channel identifier (CI) decoder circuit 616 and identification comparator circuit 614. RX controller 604 receives control signals 640 and burst mode controller (BMC) clock signal 632.

Multiplexer (MUX) circuit 620 of FIG. 6 communicates with de-scrambler circuit 606 which communicates with CRC decoder circuit 608. The CRC decoder circuit 608 communicates with decryption circuit 610 which communicates with de-formatter and serial to parallel circuit 612. De-formatter and serial to parallel circuit 612 communicates with memory unit 408 or 508 of FIG. 4 and 5, respectively, represented by arrow 636.

Unique Word detector circuit 602 of FIG. 6 communicates with RX controller 604, which includes transmitting it UW detect delay signal 638. Unique Word detector circuit 602 receives BMC clock signal 632, Unique Word detect signal 634, RX clock signal 628 and RX data signal 630. Receiving (RX) data adjustment FIFO circuit 618 communicates with MUX 620, XCAC/UW/CI FIFO circuit 622 and CI decoder circuit 616. RX data adjustment FIFO circuit 618 receives RX clock signal 628, RX data signal 630 and BMC clock signal 632. The XCAC/UW/CI FIFO circuit 622 communicates with MUX 620. FIFO circuit 622 receives the BMC clock signal 632.

Phase comparator circuit 626 of FIG. 6 communicates with clock divider and digital phase lock loop (DPLL) circuit 624, which includes transmitting it in phase signal 646, retarded signal 648 and advanced signal 650. Phase comparator 626 receives external frame synchronization signal 642 and internal frame signal 644. Clock divider and DPLL circuit 624 transmits BMC clock signal 632 to FIFO circuit 622, RX data adjustment FIFO circuit 618, RX controller 604 and Unique Word detector 602. Clock divider and DPLL circuit 624 receives a 19.2 megahertz signal 652.

Figure 7:
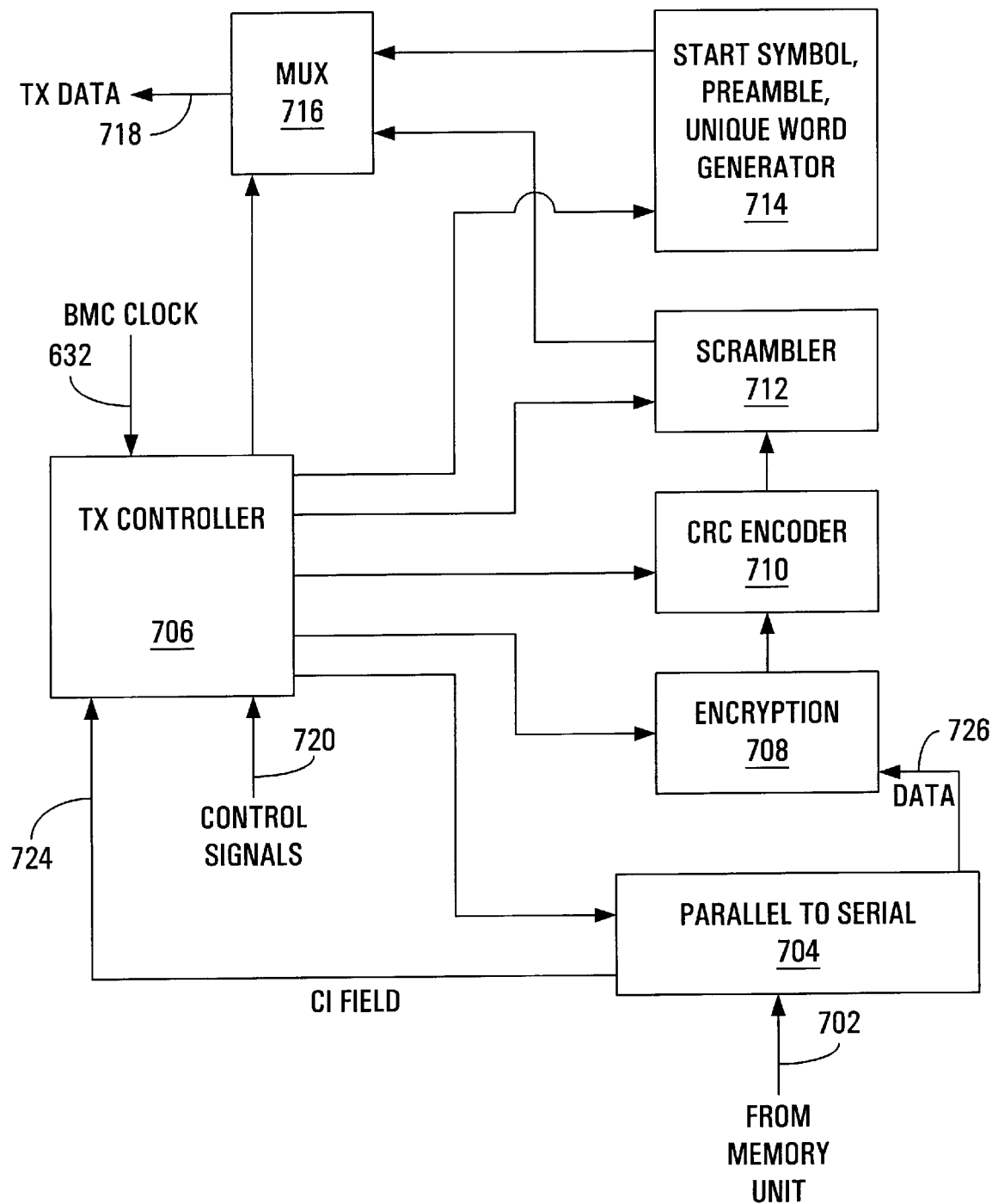
FIG. 7 illustrates a block diagram of the hardware located within one present invention embodiment of the time division multiple access transmitter (TDMA TX) of FIGS. 4 and 5.

FIG. 7 illustrates a block diagram of the hardware located within circuit 700, which is one present invention embodiment of the time division multiple access transmitter (TDMA TX) 428 and 528 of FIGS. 4 and 5, respectively. Transmitter (TX) controller circuit 706 communicates with multiplexer (MUX) circuit 716, start symbol (SS)/preamble/Unique Word (UW) generator circuit 714, scrambler circuit 712, cyclic redundancy check (CRC) encoder circuit 710, encryption circuit 708 and parallel to serial circuit 704. TX controller 706 receives control signals 720 and burst mode controller (BMC) clock signal 632.

Parallel to serial circuit 704 of FIG. 7 communicates with TX controller circuit 706, which includes transmitting it channel identifier (CI) field signal 724. Parallel to serial circuit 704 communicates with encryption circuit 708, represented by data signal 726. Parallel to serial circuit 704 receives communication data from memory unit 408 or 508 of FIGS. 4 or 5, respectively, represented by arrow 702.

Encryption circuit 708 of FIG. 7 communicates with CRC encoder circuit 710 which communicates with scrambler circuit 712. Scrambler circuit 712 communicates with MUX circuit 716. The SS/preamble/UW generator 714 communicates with MUX circuit 716 which communicates with modulator 430 or 530 of FIGS. 4 and 5, respectively, represented by TX data signal 718.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A communication system allowing a portable station of a personal handy phone system to support a conference call, said communication system comprising:
    a) a portable station comprising:
        a plurality of receiving channel circuits for processing a plurality of first input signals from a first to a second data format, wherein each receiving channel circuit corresponds to a respective communication slot of a communication frame;
        a plurality of transmitting channel circuits for processing a plurality of first output signals from said second to said first data format, wherein each transmitting channel circuit corresponds to a respective communication slot of said communication frame; and
        a signal processor circuit for mixing said plurality of first input signals which are in said second data format and for mixing said plurality of first output signals which are in said second data format;
    b) a plurality of cell stations, each comprising:
        a plurality of receiving channel circuits for processing a plurality of second input signals from said first to said second data format for a cell station, wherein each of said receiving channel circuits of said cell station corresponds to a respective communication slot of said communication frame; and
        a plurality of transmitting channel circuits for processing a plurality of second output signals from said second to said first data format, wherein each of said transmitting channel circuits of said cell station corresponds to a respective communication slot of said communication frame;
    c) said plurality of transmitting channel circuits, said plurality of receiving channel circuits, and said signal processor circuit of said portable station enabling said portable station to communicate voice information simultaneously with two or more of said plurality of cell stations.

2. A communication system as described in claim 1 wherein said portable station further comprises a digital/voice interface having an input coupled to receive said plurality of first input signals from said signal processor circuit and also having an output coupled to supply said plurality of first output signals to said signal processor circuit.

3. A communication system as described in claim 2 wherein said portable station further comprises a memory unit having an input coupled to receive said plurality of first input signals, said memory unit having said input coupled to receive said plurality of first output signals from said transmitting channel circuits, said memory unit also having an output coupled to transmit said plurality of first input signals to supply said plurality of receiving channel circuits.

4. A communication system as described in claim 1 wherein said first data format is a digital baseband signal.

5. A communication system as described in claim 1 wherein said second data format is a digital signal.

6. A communication system as described in claim 5 wherein said first data format is a digital baseband signal.

7. A communication system as described in claim 4 wherein said digital baseband signal is a 32 kilobits per second adaptive differential pulse code modulation data format.

8. A communication system as described in claim 5 wherein said digital signal is a 64 kilobits per second pulse code modulation data format.

9. A communication system as described in claim 6 wherein said digital baseband signal is a 32 kilobits per second adaptive differential pulse code modulation data format while said digital signal is a 64 kilobits per second pulse code modulation data format.

10. A communication system allowing a portable station of a personal handy phone system to support a conference call, said communication system comprising:
    a) a portable station comprising:
        four receiving channel circuits for processing four first input signals from a first to a second data format, wherein each receiving channel circuit corresponds to a respective communication slot of a communication frame;
        four transmitting channel circuits for processing four first output signals from said second to said first data format, wherein each transmitting channel circuit corresponds to a respective communication slot of said communication frame; and
        a signal processor circuit for mixing said four first input signals which are in said second data format and for mixing said four first output signals which are in said second data format;
    b) a plurality of cell stations, each comprising:
        four receiving channel circuits for processing four second input signals from said first to said second data format for a cell station, wherein each receiving channel circuits of said cell station corresponds to a respective communication slot of said communication frame; and
        four transmitting channel circuits for processing four second output signals from said second to said first data format, wherein each transmitting channel circuit of said cell station corresponds to a respective communication slot of said communication frame;
    c) said transmitting channel circuits, said receiving channel circuits, and said signal processor circuit of said portable station enabling said portable station to communicate voice information simultaneously with at least two cell stations.

11. A communication system as described in claim 10 wherein said portable station further comprises a digital/ voice interface having an input coupled to receive said four first input signals from said signal processor circuit and also having an output coupled to supply said four first output signals to said signal processor circuit.

12. A communication system as described in claim 11 wherein said portable station further comprises a memory unit having an input coupled to receive said four first input signals, said memory unit having said input coupled to receive said four first output signals from said transmitting channel circuits, said memory unit also having an output coupled to transmit said four first input signals to supply said four receiving channel circuits.

13. A communication system as described in claim 11 wherein said first data format is a digital baseband signal and wherein said second data format is a digital signal.

14. A communication circuit within a portable station of a personal handy phone system for supporting a conference call, said circuit comprising:

a first circuit for receiving an input radio signal and for storing a first signal;

a plurality of receiving channel circuits coupled to receive said first signal and for processing a plurality of said first signals of a first data format into a second data format;

a signal processor circuit having an input coupled to receive said plurality of first signals from said plurality of receiving channel circuits;

a digital/voice interface having an input coupled to receive said plurality of first signals from said signal processor circuit, wherein said signal processor circuit is coupled to receive a plurality of second signals from said digital/voice interface;

a plurality of transmitting channel circuits coupled to receive said plurality of second signals from said signal processor circuit, said plurality of transmitting channel circuits for processing said second signals of said second data format into said first data format, said plurality of transmitting channel circuits and said plurality of receiving channel circuits together for allowing said portable station to communicate voice information simultaneously with a plurality of cell stations of said personal handy phone system;

a time division multiple access transmitter coupled to receive a second signal of said plurality of second signals from first circuit; and a modulator having an input coupled to receive said second signal from an output of said time division multiple access transmitter, said modulator for modulating said second signal into an output radio signal.

15. A communication circuit within a portable station as described in claim 14 wherein said first circuit comprises:

a demodulator circuit coupled to receive said input radio signal that is demodulated into said first signal of said first data format;

a time division multiple access receiver coupled to receive said first signal from said demodulator; and a memory unit coupled to receive said first signal from said time division multiple access receiver, said memory unit having said input coupled to receive said plurality of second signals from an output of said plurality of transmitting channel circuits.

16. A communication circuit within a portable station as described in claim 15 wherein said memory unit is 2 kilobits of random access memory and wherein said first data format is a digital baseband signal and wherein said second data format is a digital signal.

17. A communication circuit within a portable station as described in claim 16 wherein said digital baseband signal is a 32 kilobits per second adaptive differential pulse code modulation data format.

18. A communication circuit within a portable station as described in claim 16 wherein said digital signal is a 64 kilobits per second pulse code modulation data format.

19. A communication circuit within a portable station as described in claim 16 wherein said digital/voice interface is a pulse code modulation (PCM)/voice interface.

20. A communication circuit within a portable station as described in claim 16 wherein said digital/voice interface is an integrated service digital network (ISDN) interface.

* * * * *